United States Patent [19]

Foucht

[11] 4,264,745

[45] Apr. 28, 1981

[54] FIRE-RETARDANT POLYURETHANE FOAM BASED ON A BROMINE-CONTAINING POLYESTER

[75] Inventor: Millard E. Foucht, Newark, Ohio

[73] Assignee: Owens-Corning Fiberglas Corporation, Toledo, Ohio

[21] Appl. No.: 75,480

[22] Filed: Sep. 14, 1979

[51] Int. Cl.$^3$ .................. C08G 18/14; C08G 18/46; C08G 63/68

[52] U.S. Cl. ................... 521/171; 521/107; 521/906; 528/297; 528/299

[58] Field of Search ................ 521/107, 171, 906; 528/297, 299

[56] References Cited

U.S. PATENT DOCUMENTS

| | | | |
|---|---|---|---|
| 3,400,085 | 9/1968 | Kujawa et al. | 521/107 |
| 3,455,886 | 7/1969 | Versnel | 528/297 |
| 3,502,601 | 3/1970 | Case et al. | 528/73 |
| 3,676,376 | 7/1972 | Svoboda et al. | 521/107 |
| 3,929,866 | 12/1975 | Baldino et al. | 521/171 |
| 3,933,693 | 1/1976 | Priest et al. | 521/171 |
| 3,981,827 | 9/1976 | Papa et al. | 521/171 |
| 3,988,302 | 10/1976 | Klein | 521/171 |
| 4,145,488 | 3/1979 | Hayden | 521/906 |
| 4,175,072 | 11/1979 | Parr et al. | 528/299 |

OTHER PUBLICATIONS

Pape et al., Jour. of Cellular Plastics, Nov. 1968, pp. 438-432.

*Primary Examiner*—H. S. Cockeram
*Attorney, Agent, or Firm*—Ronald C. Hudgens; Philip R. Cloutier

[57] ABSTRACT

A polyol is produced as the reaction product of dibromonepentyl glycol and tetrabromophthalic anhydride with defined alkyoxides. This polyol can be used to produce a insulating foam having flame retardant properties.

10 Claims, No Drawings

FIRE-RETARDANT POLYURETHANE FOAM BASED ON A BROMINE-CONTAINING POLYESTER

BACKGROUND OF THE INVENTION

This invention relates to flame retarding polyols. In one of its more specific aspects, this invention relates to the production of flame retarding polyols which, when combined with isocyanates, produce insulating foams having good fire retardant properties.

The use of polyols to react with isocyanates to produce urethane or isocyanurate foams is well known. Used as commercial insulation, it is imperative that such foams possess a high fire retardancy.

There have now been discovered polyols which, when used for the production of such foams, impart to the resulting product highly desirable fire retardancy properties. This invention provides such polyols and the resulting foams.

STATEMENT OF THE INVENTION

According to this invention there is provided a polyol comprising the reaction product of dibromoneopentyl glycol and tetrabromophthalic anhydride, or its acid, and an alkylene oxide.

Also according to this invention, there is provided urethane and isocyanurate foams produced from a polyol which is the reaction product of dibromoneopentyl glycol and tetrabromophthalic anhydride, or its acid.

In the prefered production, a glycol, such as tetraethylene glycol, diethylene glycol and the like, is introduced into the reaction mixture to provide liquidity to the resulting reaction product. The amount of the glycol which can be employed can be within the range of from about 1 to about 99 mol percent of the total of the glycol reactants.

The relative amounts of dibromoneopentyl glycol and tetrabromophthalic anhydride which can be employed over a wide range, each from about 1 to about 99 mol percent of the total of the two reactants, although stoichiometric quantities of both are preferred.

Any suitable alkylene oxide can be employed. Suitable oxides include propylene oxide, ethylene oxide, and the like. The alkylene oxide will be included in the reaction mixture in an amount within the range of from about 25 to about 75 mole percent.

In general, the reaction is conducted at a temperature within the range of from about 110° to about 130° C. under a nitrogen atmosphere, as described in detail below.

EXAMPLE I

This example demonstrates the production of a polyol of this invention.

294 grams of tetraethylene glycol, and 321 grams of dibromoneopentyl glycol were introduced into a reactor. The mixture was heated to a temperature of 110° C. and agitated to dissolve the glycol. About 7.2 grams of sodium acetate were then added to the mixture.

While maintaining the temperature at about 110° C., 1392 grams of tetrabromophthalic anyhydride were added, the anhydride being added in 10 to 20 gram quantities, each quantity being added slowly and continuously with 5 to 10 minute reaction times therebetween. After each reaction period, the reaction mixture became clear until about one half of the anhydride had been added, after which, the reaction mixture remained cloudy after each addition. After the addition of all of the anhydride, the temperature was raised to 130° C. and maintained at that temperature for 2½ hours.

At this point, the reaction mixture had an acid number of 107 compared to a theoretical acid number of 86.

The reaction was continued for ½ hour after which a sample was hydrolized and tested for acid number which was 85.

The reaction mixture temperature was maintained at 128° to 130° C. and propylene oxide addition was initiated at a rate of 10 ml per minute. After about 100 ml of propylene oxide had been added, the reaction mixture became clear.

Propylene oxide addition was continued until about 190 grams, total, had been added, at which point the resulting reaction mixture had an acid number of 41.

7.2 grams of sodium acetate were then added. Thereafter, an additional 100 ml of propylene oxide were added. After refluxing for about 3 hours, the acid number was determined as 2.4.

Two ml, additional, propylene oxide were added and the mixture was refluxed for about 45 minutes, after which time the acid number was 0.81.

A condenser and an acetone-dry ice trap were attached to the reactor and the mixture was heated to 110° to 135° C. under a vacuum of 29 inches Hg. Thereafter conditions were maintained steady for 15 minutes after which period no further condensate was collected.

The vacuum was removed and the mixture was recovered as a viscous liquid consisting of 2,226 grams of resin. The mixture had a hydroxyl number of about 150 and a bromine content of about 55 weight percent.

The reaction product polyol can be employed to produce any urethane, isocyanurate, or other type of foam or material where fire resistance is significant, such as in foamed insulating products.

The reaction product polyol (RPP) was employed, with various combinations of two other aromatic-based polyols, and an isocyanate, together with other ingredients conventionally employed, to produce various foams which were evaluated by Butler Flame Testing. In some samples, a second flame inhibitor, dimethyl methyl phosphonate was also included. Results were as shown in Table I.

| Composition, % By Weight | FOAM | | | | | | |
| --- | --- | --- | --- | --- | --- | --- | --- |
| | I | II | III | IV | V | VI | VII |
| Isocyanate[1] | 50 | 50 | 50 | 50 | 50 | 50 | 50 |
| Polyol I[2] | 22.58 | 20.58 | 19.88 | 19.58 | 20.58 | 19.88 | 19.58 |
| Polyol II[3] | 12.10 | 10.10 | 9.80 | 9.60 | 10.10 | 9.80 | 9.60 |
| RPP (Polyol) | 0 | 4.0 | 5.0 | 6.0 | 3.25 | 4.0 | 9.5 |
| Dimethyl Methyl Phosphonate | 0 | 0 | 0 | 0 | 1.0 | 1.2 | 1.5 |
| Silicone Surfactant | 0.3 | 0.3 | 0.3 | 0.3 | 0.3 | 0.3 | 0.3 |

-continued

| Composition, % By Weight | FOAM | | | | | | |
|---|---|---|---|---|---|---|---|
| | I | II | III | IV | V | VI | VII |
| Tin Catalyst | 0.02 | 0.02 | 0.02 | 0.02 | 0.02 | 0.02 | 0.0 |
| Fluorohydrocarbon Foaming Agent | 15.0 | 15.0 | 15.0 | 15.0 | 15.0 | 15.0 | 15.0 |
| Properties of Foam | | | | | | | |
| Density g/cc. | 1.85 | 1.78 | 1.86 | 1.91 | 2.1 | 2.1 | 1.9 |
| Butler Flammability | | | | | | | |
| Weight Retention, % | 55.0 | 81.0 | 81.0 | 82.5 | 83.7 | 84.3 | 83.6 |
| Burn Zone, inches | 10" to 12" | 9¼ & above | 9¼ & above | 9¼ | 5½ to 9¼ | 5½ to 9¼ | 5¼ to 9¼ |
| Time to Extinguish, Sec. | 11.9 | 1.2 | 0 | 0.33 | 0 | 0 | 0 |

[1]Mondur MR - Isocyanate (Polymeric) Mobay Chemical Co.
[2]R-350-X Polyol - Jefferson Chemical Co.
[3]R-650-X Polyol - Jefferson Chemical Co.

From the above data, it will be seen that inclusion of the reaction product polyol in the total composition in an amount within the range of from about 4 to about 6 weight percent is significantly effective in improving the Butler Flammability of the resulting urethane foam. When the foam also contained a second flame inhibitor, such as dimethyl methyl phosphonate, the reaction product polyol in an amount within the range of from about 2 to about 3 weight percent was effective. The amount of the second inhibitor was within the range of from about 3.25 to about 9.5 weight percent.

From these data, it can be seen that an amount of the reaction product polyol within the range of from about 2 to about 10 percent by weight would be effective in improving Butler Flammability of the resulting foam. If the foam also contains a phosphonate inhibitor, an amount within the range of at least about 0.5 weight percent is effective.

It will be seen from the above that various modifications can be made to this invention. Such, however, are to be considered within the scope of the invention.

I claim:

1. A foamed insulation product comprising the reaction product of an organic isocyanate and a polyol, and polyol comprising the reaction product of a mixture comprising dibromoneopentyl glycol, an alkylene oxide and tetrabromophthalic acid or anhydride.

2. A foamed insulating product comprising the reaction product of an organic isocyanate and a plurality of polyols, one of said plurality of polyols comprising the reaction product of a mixture comprising dibromoneopentyl glycol, an alkylene oxide and tetrabromophthalic acid or anhydride.

3. The foamed insulating product of claim 2 in which said reaction product is employed in an amount within the range of from about 4 to about 6 weight percent of the total weight of the reactants.

4. The foamed insulation product of claim 1 comprising dimethyl methyl phosphonate.

5. A foamed insulation product produced from an organic isocyanate and a plurality of polyols, one of said plurality being the reaction of a first polyol and a second different polyol, said first polyol comprising the reaction product of a mixture comprising dibromoneopentyl glycol, an alkylene oxide and tetrabromophthalic acid or anhydride, said reaction product being employed in an amount within the range of from about 4 to about 6 weight percent of the total weight of the reactants.

6. A foamed insulation product produced from an organic isocyanate, dimethyl phosphonate and a polyol comprising the reaction product of a mixture comprising dibromoneopentyl glycol, an alkylene oxide and tetrabromophthalic acid or anyhydride.

7. The insulation product of claim 1 in said alkylene oxide is employed in an amount within the range of from about 25 to about 75 mol percent of the total weight of the reactants.

8. The insulation product of claim 1 in which said polyol is employed in an amount within the range of from about 4 to about 9.5 weight percent of the total weight of the reactants.

9. The insulation product of claim 8 in which said product has a Butler Flammabililty weight retention of from about 81 to about 84.3.

10. The insulation product of claim 1 in which said polyol is employed in an amount within the range of from about 4 to about 6 weight percent of the total weight of the reactants.

* * * * *